(12) United States Patent
Kim

(10) Patent No.: US 12,498,816 B2
(45) Date of Patent: Dec. 16, 2025

(54) TOUCH DISPLAY DEVICE

(71) Applicant: LG Display Co., Ltd., Seoul (KR)

(72) Inventor: Cheolse Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/942,057

(22) Filed: Nov. 8, 2024

(65) Prior Publication Data

US 2025/0264952 A1    Aug. 21, 2025

(30) Foreign Application Priority Data

Feb. 15, 2024 (KR) ........................ 10-2024-0021628

(51) Int. Cl.
*G06F 3/041* (2006.01)
*G06F 3/044* (2006.01)

(52) U.S. Cl.
CPC .......... *G06F 3/0416* (2013.01); *G06F 3/0446* (2019.05); *G06F 2203/04104* (2013.01)

(58) Field of Classification Search
CPC ................. G06F 3/0416; G06F 3/0446; G06F 2203/04104
See application file for complete search history.

(56) References Cited

U.S. PATENT DOCUMENTS

| | | | |
|---|---|---|---|
| 8,760,434 B2* | 6/2014 | Fujita | G06F 3/045 345/174 |
| 9,052,770 B2 | 6/2015 | Hong et al. | |
| 2006/0097991 A1* | 5/2006 | Hotelling | G06F 3/04164 345/173 |
| 2008/0007535 A1* | 1/2008 | Li | G06F 3/047 349/23 |
| 2009/0096762 A1* | 4/2009 | Hinata | G06F 3/0443 345/174 |
| 2009/0096763 A1* | 4/2009 | Hinata | G06F 3/0446 345/174 |
| 2009/0289643 A1* | 11/2009 | Shimizu | G06F 3/045 324/722 |
| 2009/0309851 A1* | 12/2009 | Bernstein | G06F 3/0446 345/174 |
| 2014/0055406 A1 | 2/2014 | Hong et al. | |
| 2016/0246094 A1* | 8/2016 | Yang | G02F 1/1347 |
| 2019/0179484 A1* | 6/2019 | Jang | G06F 3/0418 |
| 2020/0004368 A1* | 1/2020 | Kim | G06F 3/04164 |
| 2020/0210005 A1* | 7/2020 | Kim | G06F 3/0446 |

(Continued)

FOREIGN PATENT DOCUMENTS

KR        10-1973168 B1    4/2019

*Primary Examiner* — Amy Onyekaba
(74) *Attorney, Agent, or Firm* — Fenwick & West LLP

(57) ABSTRACT

Disclosed is a touch display device that detects multiple touches in a touch sensing scheme of sensing change in capacitance of a surface of a touch electrode. The touch display device includes a display panel including a touch electrode; a switch circuit connected to each of measurement positions of the touch electrode; and a touch driving circuit connected to each of the measurement positions of the touch electrode via the switch circuit, wherein the touch driving circuit is configured to apply a touch driving signal to the touch electrode, receive sensed values from the measurement positions based on an operation of the switch circuit, and calculate coordinates of multi-touch points on the touch electrode, based on the sensed values.

19 Claims, 10 Drawing Sheets

(56) References Cited

U.S. PATENT DOCUMENTS

| | | | |
|---|---|---|---|
| 2021/0173437 A1* | 6/2021 | Bae ........................ | G06F 1/1616 |
| 2021/0303127 A1* | 9/2021 | Kwak .................... | G06F 3/0446 |
| 2022/0137752 A1* | 5/2022 | Lin ........................ | H10K 59/40 |
| | | | 345/174 |
| 2023/0066997 A1* | 3/2023 | Lee ........................ | G06F 3/0443 |

* cited by examiner

| case | Turned-off switch | Measurment position | Number of measurment values |
|---|---|---|---|
| 1 | | a, b, c, d | 4 |
| 2 | sw1, sw2 | c. d | 2 |
| 3 | sw3, sw4 | a, b | 2 |
| 4 | sw1, sw3 | b, d | 2 |
| 5 | sw2, sw4 | a, c | 2 |
| 6 | sw1, sw4 | b, c | 2 |
| 7 | sw2, sw3 | a, d | 2 |
| 8 | sw1 | b, c, d | 3 |
| 9 | sw2 | a, c, d | 3 |
| 10 | sw3 | a, b, d | 3 |
| 11 | sw4 | a, b, c | 3 |
| Total | | | 28 |

FIG. 5

TOUCH DISPLAY DEVICE

CROSS-REFERENCE TO RELATED APPLICATION

This application claims priority from Republic of Korea Patent Application No. 10-2024-0021628 filed on Feb. 15, 2024, which is hereby incorporated by reference in its entirety.

BACKGROUND

Field

The present disclosure relates to a touch display device.

Description of Related Art

Display devices used in computer monitors, TVs, mobile phones, etc. include organic light-emitting display device (OLED) that emits light on its own, a liquid crystal display device (LCD) that requires a separate light source, etc.

The scope of application of display devices is becoming more diverse, including not only computer monitors and TVs but also personal portable devices. Research is being conducted on display devices with a large display area size and reduced volume and weight.

Furthermore, development of touch technology is underway to apply a touch-based input scheme that allows a user to easily and intuitively and conveniently input information or commands to a display device.

SUMMARY

To apply the touch-based input scheme to the display device, a scheme of combining a touch panel including a touch sensor with a display panel or embedding a touch sensor in the display panel is used. In this scheme, the touch sensor detects a touch based on a sensing result of change in capacitance of a surface of a touch electrode.

However, the scheme for sensing the change in the capacitance of the surface of a single monolithic touch electrode may detect only a single touch and may not be able to detect multiple touches.

Accordingly, a purpose of the present disclosure is to provide a touch display device that may detect multiple touches in a touch sensing scheme of sensing change in capacitance of a surface of a touch electrode to improve touch performance.

Purposes according to the present disclosure are not limited to the above-mentioned purpose. Other purposes and advantages according to the present disclosure that are not mentioned may be understood based on following descriptions, and may be more clearly understood based on embodiments according to the present disclosure. Further, it will be easily understood that the purposes and advantages according to the present disclosure may be realized using means shown in the claims or combinations thereof.

One aspect of the present disclosure provides a touch display device comprising: a display panel including a touch electrode having measurement positions; a switch circuit connected to each of the measurement positions of the touch electrode; and a touch driving circuit connected to each of the measurement positions of the touch electrode via the switch circuit, wherein the touch driving circuit is configured to apply a touch driving signal to the touch electrode, receive sensed values from the measurement positions based on an operation of the switch circuit, and calculate coordinates of multi-touch points on the touch electrode, based on the sensed values.

Another aspect of the present disclosure provides a touch display device comprising: a display panel including a touch electrode and configured to operate in a time-divided manner into a display period for displaying an image and a touch period for detecting a touch; a first switch circuit, a second switch circuit, a third switch circuit, and a fourth switch circuit respectively connected to a first measurement position, a second measurement position, a third measurement position, and a fourth measurement position respectively corresponding to fours corner of the touch electrode; and a touch driving circuit connected to each of the first to fourth measurement positions of the touch electrode via each of the first to fourth switch circuits, wherein during the touch period, the touch driving circuit is configured to apply a touch driving signal to the touch electrode, receive sensed values from the first to fourth measurement positions based on an operation of the first to fourth switch circuits, and calculate coordinates of multi-touch points on the touch electrode, based on the sensed values.

Still another aspect of the present disclosure provides a touch display device comprising: a display panel including a touch electrode having measurement positions; a switch circuit connected to each of the measurement positions of the touch electrode; and a touch driving circuit connected to each of the measurement positions of the touch electrode via the switch circuit, wherein the touch driving circuit is configured to apply a touch driving signal to the touch electrode, receive sensed values from the measurement positions based on an operation of the switch circuit, and calculate coordinates of multi-touch points on the touch electrode, based on the sensed values, wherein the touch electrode includes four corners, and respective four median points of four sides, wherein the measurement positions include first to eighth measurement positions corresponding to the four corners and the four median points.

According to the aspects of the touch display device, the touch performance may be improved by detecting multiple point touch in the touch sensing scheme of sensing change in capacitance of the touch electrode.

Furthermore, the touch sensor may detect multiple point touch on a single monolithic electrode, such that a manufacturing cost of the touch panel may be lowered.

Furthermore, when combining the touch panel with the display panel, luminance and sharpness of a displayed image may be maintained.

Furthermore, the production energy of the touch panel may be reduced, and the touch panel process may be optimized.

Effects of the present disclosure are not limited to the effects mentioned above, and other effects not mentioned will be clearly understood by those skilled in the art from the description below.

In addition to the above effects, specific effects of the present disclosure are described together while describing specific details for carrying out the present disclosure.

BRIEF DESCRIPTION OF DRAWINGS

FIG. 5 is a table showing the measurement positions and the number of measurement values under the turn-on and turn-off of the switch circuit in the touch display device according to an embodiment of the present disclosure.

DETAILED DESCRIPTION

Figure 1:
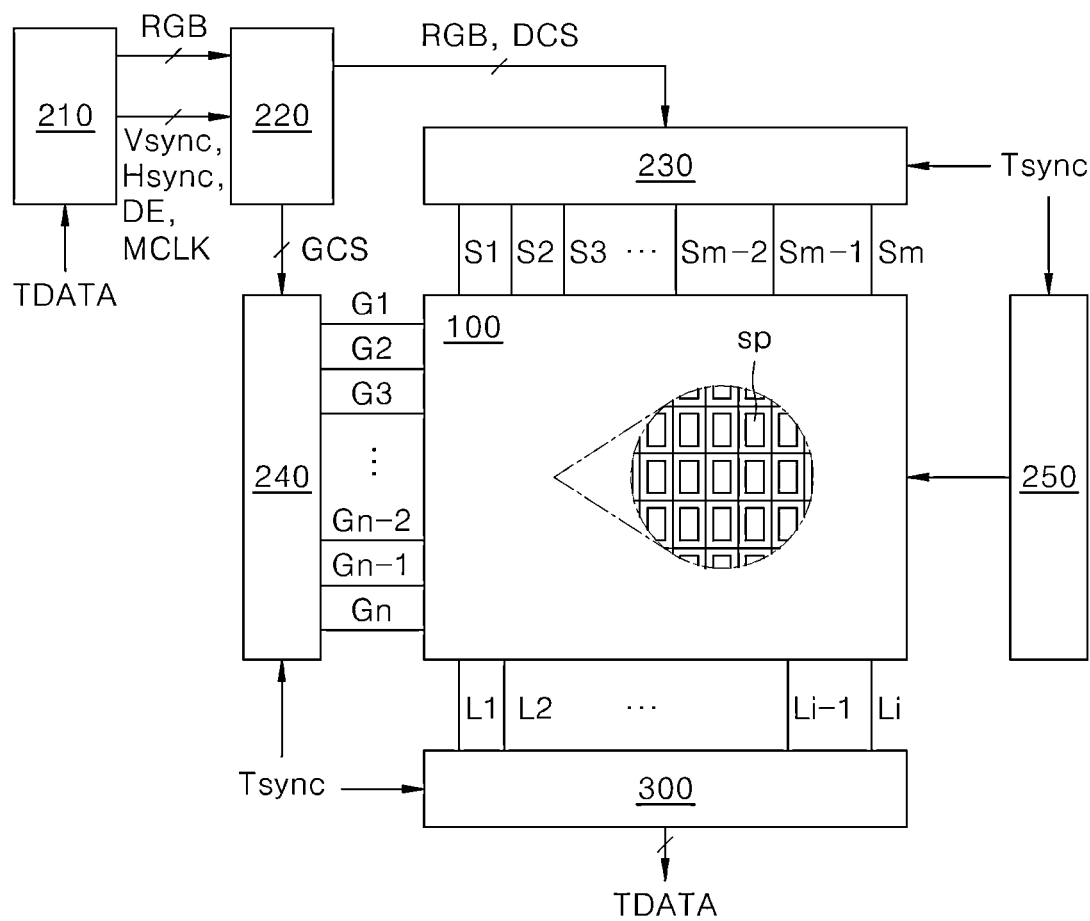
FIG. 1 is a block diagram of a touch display device according to an embodiment of the present disclosure.

Advantages and features of the present disclosure, and a method of achieving the advantages and features will become apparent with reference to embodiments described later in detail together with the accompanying drawings. However, the present disclosure is not limited to the embodiments as disclosed under, but may be implemented in various different forms. Thus, these embodiments are set forth only to make the present disclosure complete, and to completely inform the scope of the present disclosure to those of ordinary skill in the technical field to which the present disclosure belongs, and the present disclosure is only defined by the scope of the claims.

For simplicity and clarity of illustration, elements in the drawings are not necessarily drawn to scale. The same reference numbers in different drawings represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

A shape, a size, a ratio, an angle, a number, etc. disclosed in the drawings for illustrating embodiments of the present disclosure are illustrative, and the present disclosure is not limited thereto.

The terminology used herein is directed to the purpose of describing particular embodiments only and is not intended to be limiting of the present disclosure. As used herein, the singular constitutes "a" and "an" are intended to include the plural constitutes as well, unless the context clearly indicates otherwise. It will be further understood that the terms "comprise", "comprising", "include", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of associated listed items. Expression such as "at least one of" when preceding a list of elements may modify the entire list of elements and may not modify the individual elements of the list. In interpretation of numerical values, an error or tolerance therein may occur even when there is no explicit description thereof.

In addition, it will also be understood that when a first element or layer is referred to as being present "on" a second element or layer, the first element may be disposed directly on the second element or layer or may be disposed indirectly on the second element or layer with a third element or layer being disposed between the first and second elements or layers. It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Further, as used herein, when a layer, film, region, plate, or the like is disposed "on" or "on a top" of another layer, film, region, plate, or the like, the former may directly contact the latter or still another layer, film, region, plate, or the like may be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like is disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

In descriptions of temporal relationships, for example, temporal precedent relationships between two events by using terms such as "after", "subsequent to", "before", etc., another event may occur therebetween unless "directly after", "directly subsequent" or "directly before" is not indicated.

When a certain embodiment may be implemented differently, a function or an operation specified in a specific block may occur in a different order from an order specified in a flowchart. For example, two blocks in succession may be actually performed substantially concurrently, or the two blocks may be performed in a reverse order depending on a function or operation involved.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section as described under could be termed a second element, component, region, layer or section, without departing from the spirit and scope of the present disclosure.

When an embodiment may be implemented differently, functions or operations specified within a specific block may be performed in a different order from an order specified in a flowchart. For example, two consecutive blocks may actually be performed substantially simultaneously, or the blocks may be performed in a reverse order depending on related functions or operations.

The features of the various embodiments of the present disclosure may be partially or entirely combined with each other, and may be technically associated with each other or operate with each other. The embodiments may be implemented independently of each other and may be implemented together in an association relationship.

In interpreting a numerical value, the value is interpreted as including an error range unless there is no separate explicit description thereof.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, "embodiments," "examples," "aspects, and the like should not be construed such that any aspect or design as described is superior to or advantageous over other aspects or designs.

Further, the term 'or' means 'inclusive or' rather than 'exclusive or'. That is, unless otherwise stated or clear from the context, the expression that 'x uses a or b' means any one of natural inclusive permutations.

The terms used in the description below have been selected as being general and universal in the related technical field. However, there may be other terms than the terms depending on the development and/or change of technology, convention, preference of technicians, etc. Therefore, the terms used in the description below should not be understood as limiting technical ideas, but should be understood as examples of the terms for illustrating embodiments.

Further, in a specific case, a term may be arbitrarily selected by the applicant, and in this case, the detailed meaning thereof will be described in a corresponding description section. Therefore, the terms used in the description below should be understood based on not simply the name of the terms, but the meaning of the terms and the contents throughout the Detailed Descriptions.

In description of flow of a signal, for example, when a signal is delivered from a node A to a node B, this may include a case where the signal is transferred from the node A to the node B via another node unless a phrase 'immediately transferred' or 'directly transferred' is used.

Throughout the present disclosure, "A and/or B" means A, B, or A and B, unless otherwise specified, and "C to D" means C inclusive to D inclusive unless otherwise specified.

"At least one" should be understood to include any combination of one or more of listed components. For example, at least one of first, second, and third components means not only a first, second, or third component, but also all combinations of two or more of the first, second, and third components.

Hereinafter, embodiments of the present disclosure will be described using the attached drawings. A scale of each of components as shown in the drawings is different from an actual scale thereof for convenience of illustration, and therefore, the present disclosure not limited to the scale as shown in the drawings.

Hereinafter, a touch display device according to some embodiments will be described.

As used herein, multi-touch may be defined as touching at least two points on a touch electrode used in a touch sensor of a display panel.

FIG. 1 is a block diagram of a touch display device according to an embodiment of the present disclosure.

The touch display device may include a display panel 100, a data driving circuit 230, a gate driving circuit 240, a power supply circuit 250, and a touch driving circuit 300.

The display panel 100 may include a touch panel in which a touch electrode and/or touch wirings for touch sensing are disposed. In this regard, the touch panel may refer to a portion of the display panel 100 including components necessary for touch sensing, or may refer to a collection of the touch electrode and/or the touch wirings disposed in the display panel 100.

The display panel 100 may operate in a time-divided manner into a display period for image display and a touch period for touch sensing. During the display period, data of an input image may be written to a pixel array. During the touch period, a touch driving signal may be applied to the touch electrode so that a touch input onto the display panel may be detected.

The data driving circuit 230 may drive data lines S1 to Sm disposed in the display panel 100. For example, during the display period, the data driving circuit 230 may apply data voltage to the data lines S1 to Sm to drive a plurality of sub-pixels sp.

The gate driving circuit 240 may drive gate lines G1 to Gn disposed in the display panel 100. For example, during the display period, the gate driving circuit 240 may apply a scan signal to the gate lines G1 to Gn to drive the plurality of sub-pixels sp.

The power supply circuit 250 may apply a high-potential power voltage and a low-potential power voltage to respectively a high-potential power terminal and a low-potential power terminal of each of the sub-pixels sp through the power supply lines during the display period.

Furthermore, during the touch period, the power supply circuit 250 may apply a modulated high-potential power voltage and a modulated low-potential power voltage having the same period and amplitude as those of a touch driving signal applied to the touch electrode to the high-potential power terminal and the low-potential power terminal of each of the sub-pixels sp, respectively. This may minimize or at least reduce the parasitic capacitance between the touch electrode and the power supply line.

The touch driving circuit 300 may sense change in capacitance due to single touch, and the multi-touch on the display panel 100 using the touch electrode and/or the touch wirings disposed in the display panel 100. Then, the touch driving circuit 300 may calculate presence or absence of a touch and coordinates corresponding to the touch, based on the sensing result.

The timing controller 220 may receive timing signals such as a vertical synchronization signal Vsync, a horizontal synchronization signal Hsync, a data enable signal DE, and a main clock MCLK, etc. from a host system 210 and synchronize operation timings of the data driving circuit 230 and the gate driving circuit 240 with each other, based on the received timing signals.

The host system 210 may convert image data RGB into a format suitable for the resolution of the display panel 100. The host system 210 may transmit the timing signals Vsync, Hsync, DE, and MCLK along with the image data RGB to the timing controller 220. Furthermore, the host system 210 may execute an application program related to coordinate data TDATA of the touch input received from the touch driving circuit 300.

The timing controller 220 or the host system 210 may generate a synchronization signal Tsync to synchronize an operation timing each of the data driving circuit 230, the gate driving circuit 240, the power supply circuit 250, and the timing controller 200 with an operation timing of the touch driving circuit 300.

The synchronization signal Tsync may be constructed such that a first period having a first signal level and a second period having a second signal level may be repeated. In this regard, the first signal level may be higher than the second signal level. In the synchronization signal Tsync, the first period may correspond to a display period Td, and the second period may correspond to the touch period Tt.

Furthermore, the synchronization signal Tsync may correspond to the vertical synchronization signal Vsync used for display operation. In this case, the display period Td may correspond to an active period in the vertical synchronization signal Vsync, and the touch period Tt may correspond to a blank period in the vertical synchronization signal Vsync.

Figure 2:
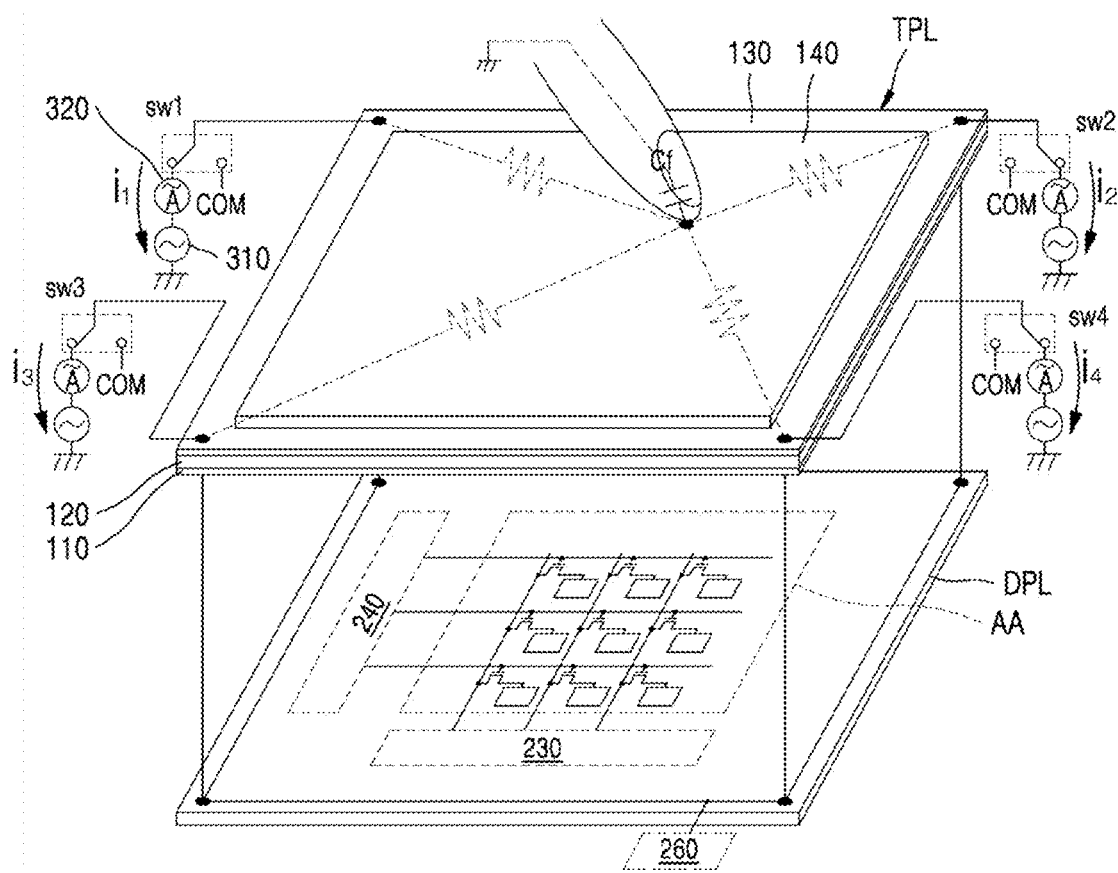
FIG. 2 is a diagram for illustrating a detailed configuration of a touch display device according to an embodiment of the present disclosure.

FIG. 2 is a diagram for illustrating a detailed configuration of a touch display device according to an embodiment of the present disclosure.

Referring to FIG. 2, the touch display device may include a display panel layer DPL in which a plurality of sub-pixels are formed in a display area AA, and a touch panel layer TPL disposed on the display panel layer DPL.

The data driving circuit 230 and the gate driving circuit 240 may be disposed in a non-display area of the display panel layer DPL.

The touch panel layer TPL may include a shielding electrode layer 110 formed on top of the display panel layer DPL, an overlay layer 120 formed on top of the shielding electrode layer 110, an optically transparent adhesive layer 130 formed on top of the overlay layer 120, and a touch electrode 140 formed on top of the optically transparent adhesive layer 130. The shielding electrode layer 110 may be made of a conductive material. Each of the overlay layer 120 and the optically clear adhesive layer 130 may be made of a transparent material.

The touch electrode 140 may be formed as a single monolithic electrode that covers a touch area of the display panel. A finger capacitor Cf may be generated between an object and the touch electrode 140. The finger capacitor may be defined as a capacitor generated between the object and the touch electrode 140 when the object such as a finger or a touch pen touches the touch electrode 140.

During the touch period, a modulated signal having the same period and amplitude as those of a touch driving signal may be applied to the shielding electrode layer 110. The shielding electrode layer 110 may be disposed between the touch electrode 140 and the display electrode to minimize or at least reduce generation of a parasitic capacitor between the touch electrode 140 and the display electrode.

In this regard, a display electrode may be defined as an electrode necessary for display operation of the display device. For example, the display electrode may be at least one of a high-potential power terminal of a driving transistor of the sub-pixel, a cathode electrode of an organic light-emitting element, the data line to which the data voltage is applied, a scan line to which the scan signal is applied, and a high-potential power terminal and a low-potential power terminal used to generate the scan signal which is applied.

The touch display device may further include a shielded electrode driver 260. This shielded electrode driver 260 may apply the modulated signal having the same period and amplitude as those of the touch driving signal to the shielded electrode layer.

A first switch SW1, a second switch SW2, a third switch SW3, and a fourth switch SW4 may be respectively connected to a first measurement position, a second measurement position, a third measurement position, and a fourth measurement position respectively as four corners of the touch electrode.

The first switch SW1, the second switch SW2, the third switch SW3, and the fourth switch SW4 may be connected to the touch driving circuit 300 and may transmit a signal corresponding to a change in capacitance of the touch electrode 140 to the touch driving circuit 300.

The touch driving circuit 300 may sense a signal corresponding to change in capacitance of the touch electrode 140 through the first switch SW1, the second switch SW2, the third switch SW3, and the fourth switch SW4. The touch driving circuit 300 may calculate the touch coordinate based on a sensed value. The touch driving circuit 300 may include a touch signal supply circuit 310 that supplies the touch driving signal to the touch electrode 140 and a sensing circuit 320 that senses the signal corresponding to the change in capacitance of the touch electrode 140.

The sensing circuit 320 may include a first sensing circuit, a second sensing circuit, a third sensing circuit, and a fourth sensing circuit. The first sensing circuit may detect a change in capacitance of the touch electrode 140 at a first corner of the touch electrode through the first switch SW1. The second sensing circuit may detect a change in capacitance of the touch electrode at a second corner of the touch electrode through the second switch SW2. The third sensing circuit detects a change in capacitance of the touch electrode at a third corner of the touch electrode through the third switch SW3. The fourth sensing circuit detects a change in capacitance of the touch electrode at a fourth corner of the touch electrode through the fourth switch SW4. In this regard, the first measurement position, the second measurement position, the third measurement position, and the fourth measurement position may correspond to the first to fourth corner of the touch electrode, respectively.

In FIG. 2, the first current signal i1 represents a signal detected by the first sensing circuit, the second current signal i2 represents a signal detected by the second sensing circuit, the third current signal i3 represents a signal detected by the third sensing circuit, and the fourth current signal i4 represents a signal detected by the fourth sensing circuit.

In addition, the common terminal COM represents a terminal to which a DC voltage is applied. The DC voltage can be applied to the touch electrode when any one of the first to fourth switches is turned off. For example, when the first to fourth switches are turned off, the DC voltage can be applied through the first to fourth corners of the touch electrode. When the first switch and the second switch are turned off, the DC voltage can be applied through the first corner and the second corner of the touch electrode. That is, depending on whether the switch is turned on, a touch driving signal or a DC voltage can be applied to the touch electrode through each corners.

Figure 3:
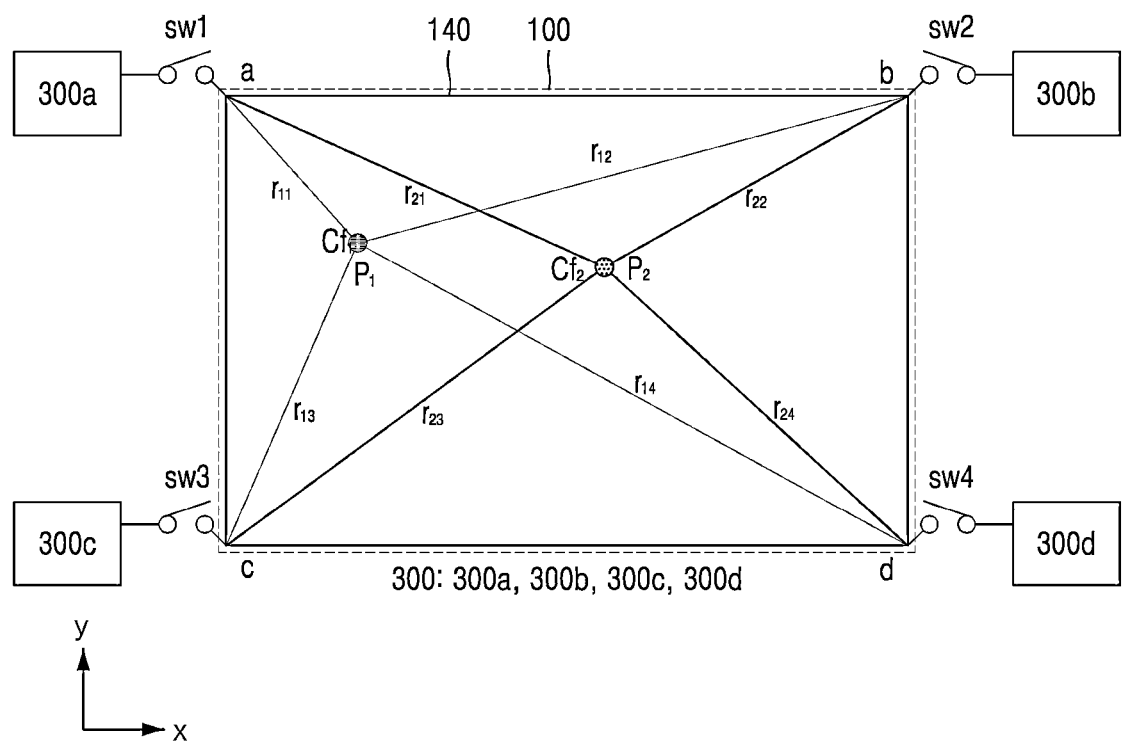
FIG. 3 is a diagram for illustrating multi-touch sensing in a touch display device according to an embodiment of the present disclosure.
Figure 4:
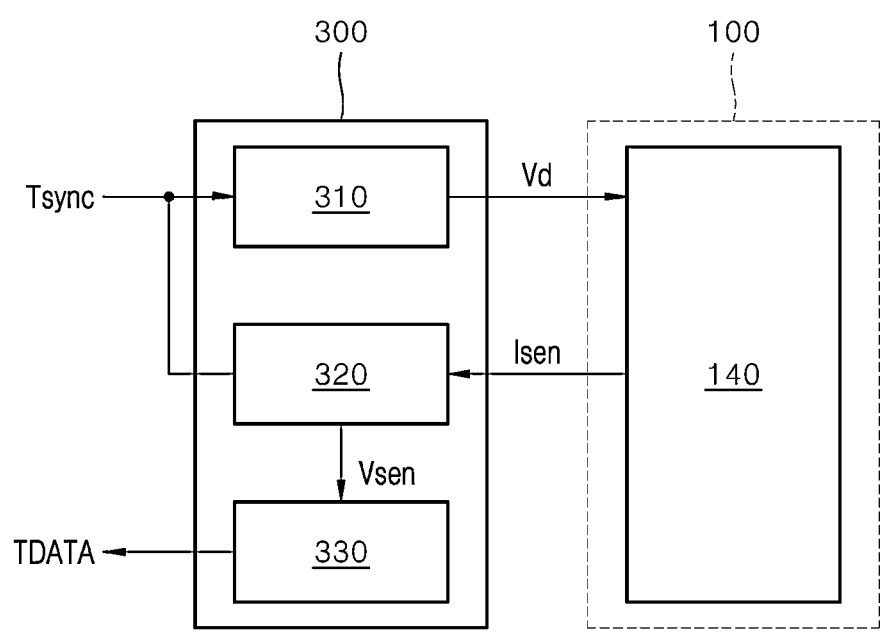
FIG. 4 is a block diagram for illustrating a touch driving circuit in FIG. 3 according to an embodiment of the present disclosure.

FIG. 3 is a diagram for illustrating multi-touch sensing in a touch display device according to an embodiment of the present disclosure. FIG. 4 is a block diagram for illustrating the touch driving circuit in FIG. 3 according to an embodiment of the present disclosure.

Referring to FIG. 3 and FIG. 4, the touch display device includes the touch electrode 140 included in the display panel, the switch circuits SW1, SW2, SW3, and SW4 connected to the first to fourth measurement positions of the touch electrode 140, respectively, and first to fourth touch driving circuits 300a, 300b, 300c, and 300d that sense changes in capacitances respectively at the four measurement positions upon the touch at a single or multiple touch points P1 and P2 through the four switch circuits SW1, SW2, SW3, and SW4, respectively. As used herein, the touch driving circuit 300 may refer to each of the first to fourth touch driving circuits 300a, 300b, 300c, and 300d or may refer to a collection of the first to fourth touch driving circuits 300a, 300b, 300c, and 300d, depending on the context.

The touch electrode 140 may be formed as a single monolithic electrode that covers a touch area of the display panel 100. The touch area may correspond to a display area AA of the display panel 100.

The first to fourth switch circuits SW1, SW2, SW3, and SW4 may be connected to the first to fourth measurement positions of the touch electrode 140, respectively. In this regard, the four measurement positions may correspond to the four corners of the touch electrode 140. Alternatively, in another example, the measurement positions may be set as the corners of the touch electrode and an intermediate point between adjacent ones of the corners.

The switch circuits SW1, SW2, SW3, and SW4 may include the first switch SW1, the second switch SW2, the third switch SW3, and the fourth switch SW4 respectively connected to the first measurement position a, the second measurement position b, the third measurement position c, and the fourth measurement position d as the four corners of the touch electrode.

Each of the touch driving circuits 300a, 300b, 300c, and 300d may apply the driving signal to the touch electrode 140, and may receive a sensed value at each of the measurement positions in response to that each of the switch circuits is turned on. The touch driving circuit 300 may be configured to calculate the coordinates of the multi-touch points on the touch electrode (for example, the coordinates of the first touch point P1 and the second touch point P2), based on the sensed values at the measurement positions.

Each of the touch driving circuits 300a, 300b, 300c, and 300d may receive the sensed value at each of the first measurement position a, the second measurement position b, the third measurement position c, and the fourth measurement position d, in response to that each of the first switch SW1, the second switch SW2, the third switch SW3, and the fourth switch SW4 is turned on. Furthermore, the touch driving circuit 300 may be configured to calculate the coordinates of the multi-touch points on the touch electrode (for example, the coordinates of the first touch point P1 and the second touch point P2), based on the sensed value at each of the first measurement position a, the second measurement position b, the third measurement position c, and the fourth measurement position d.

In this regard, the touch driving circuit 300 may be configured to calculate the coordinates of the multi-touch points on the touch electrode (for example, the coordinates of the first touch point P1 and the second touch point P2), based on all of the respective sensed value at the first measurement position a, the second measurement position b, the third measurement position c, and the fourth measurement position d, the sensed value at one or more of the first measurement position a, the second measurement position b, the third measurement position c, and the fourth measurement position d, respective resistance values r11, r12, r13, and r14 of respective paths from the first touch point P1 to the first measurement position a, the second measurement position b, the third measurement position c, and the fourth measurement position d, and respective resistance values r21, r22, r23, and r24 of respective paths from the second touch point P2 to the first measurement position a, the second measurement position b, the third measurement position c, and the fourth measurement position d. During a touch period, one of the first to fourth touch driving circuits 300a, 300b, 300c, and 300d may be configured to turn on corresponding one of the first to fourth switches SW1, SW2, SW3, and SW4 and to obtain a sensed value sensed at the measurement position connected thereto. During the touch period, each of the others of the first to fourth touch driving circuits 300a, 300b, 300c, and 300d may be configured to turn off each of the others of the first to fourth switches SW1, SW2, SW3, and SW4.

In the touch electrode 140, each of the respective resistance values r11, r12, r13, and r14 of respective paths from the first touch point P1 to the first measurement position a, the second measurement position b, the third measurement position c, and the fourth measurement position d, and the respective resistance values r21, r22, r23, and r24 of respective paths from the second touch point P2 to the first measurement position a, the second measurement position b, the third measurement position c, and the fourth measurement position d may be preset based on a sheet resistance of the touch electrode 140. That is, all of the respective resistance values of respective paths from each of the coordinates of all positions on the touch electrode 140 to the first measurement position a, the second measurement position b, the third measurement position c, and the fourth measurement position d may be preset based on the sheet resistance or sheet resistance value of the touch electrode 140.

In order to recognize the coordinates of the multi-touch points P1 and P2, the touch driving circuits 300a, 300b, 300c, and 300d may operate as follows.

First, each of all of the touch driving circuits 300a, 300b, 300c, and 300d may turn on each of all of the first switch SW1, the second switch SW2, the third switch SW3, and the fourth switch SW4 during the touch period and may obtain each of all of the sensed values sensed respectively at all of the first measurement position a, the second measurement position b, the third measurement position c, and the fourth measurement position d.

Next, the first and second touch driving circuits 300a and 300b may respectively turn on the first switch SW1 and the second switch SW2 while the third and fourth touch driving circuits 300c and 300d may respectively turn off the third switch SW3 and the fourth switch SW4. Thus, the first and second touch driving circuits 300a and 300b may respectively obtain the sensed values sensed respectively at the first measurement position a and the second measurement position b.

Next, the first and second touch driving circuits 300a and 300b may respectively turn off the first switch SW1 and the second switch SW2 while the third and fourth touch driving circuits 300c and 300d may respectively turn on the third switch SW3 and the fourth switch SW4. Thus, the third and fourth touch driving circuits 300c and 300d may respectively obtain the sensed values sensed respectively at the third measurement position c and the fourth measurement position d.

Thus, the touch driving circuit 300 may be configured to calculate the coordinates of the multi-touch points on the touch electrode (for example, the coordinates of the first touch point P1 and the second touch point P2), based on all of the respective sensed value at the first measurement position a, the second measurement position b, the third measurement position c, and the fourth measurement position d, the sensed values sensed respectively at the first measurement position a and the second measurement position b when the first switch SW1 and the second switch SW2 are turned on and the third switch SW3 and the fourth switch SW4 are tuned off, the sensed values sensed respectively at the third measurement position c and the fourth measurement position d when the first switch SW1 and the second switch SW2 are turned off and the third switch SW3 and the fourth switch SW4 are tuned on, the respective resistance values r11, r12, r13, and r14 of respective paths from the first touch point P1 to the first measurement position a, the second measurement position b, the third measurement position c, and the fourth measurement position d, and the respective resistance values r21, r22, r23, and r24 of respective paths from the second touch point P2 to the first measurement position a, the second measurement position b, the third measurement position c, and the fourth measurement position d.

Referring to FIG. 4, the touch driving circuit 300 may include the touch signal supply circuit 310, the sensing circuit 320, and a touch calculator 330. That is, each of the first to fourth touch driving circuits 300a, 300b, 300c, and 300d may include the touch signal supply circuit 310, the sensing circuit 320, and the touch calculator 330.

The touch signal supply circuit 310 may supply a touch driving voltage Vd as the touch driving signal to the touch electrode 140 of the display panel 100 in response to a synchronization signal Tsync.

The sensing circuit 320 may sense a current signal Isen corresponding to a change in capacitance of the touch electrode 140 of the display panel 100 and may provide a voltage signal Vsen corresponding to the current signal Isen to the touch calculator 330. For example, the sensing circuit 320 may include at least one integrator.

The touch calculator 330 may convert the voltage signal Vsen as the analog data into a voltage signal Vsen as a digital signal. The touch calculator 330 may calculate coordinate data TDATA based on the voltage signal Vsen as the digital signal. In this regard, the coordinate data TDATA may include the coordinate of each of the first and second touch points P1 and P2, and a touch intensity at each of the first and second touch points P1 and P2.

The touch driving circuit 300 may provide the calculated coordinate data TDATA to the host system 210. The host system 210 may execute an application program related to the coordinate data TDATA.

A more detailed description of the multi-touch coordinate calculation by the touch driving circuit 300 is as follows.

As shown in FIG. 3, the first to fourth switches SW1, SW2, SW3, and SW4 may be connected to the four corners of the touch electrode 140 having the sheet resistance, respectively. The first to fourth driving circuits 300a, 300b, 300c, and 300d having the touch driving signal supply and touch sensing functions may be respectively connected to the first to fourth switches SW1, SW2, SW3, and SW4.

Assuming that the object such as the finger or the touch pen touches the first touch point P1 and the second touch point P2, the respective resistance values of respective paths from the first touch point P1 to the first measurement position a, the second measurement position b, the third measurement position c, and the fourth measurement position d may be expressed as r11, r12, r13, and r14, respectively. The respective resistance values of respective paths from the second touch point P2 to the first measurement position a, the second measurement position b, the third measurement position c, and the fourth measurement position d may be expressed as r21, r22, r23, and r24, respectively.

In this regard, as described above, in the touch electrode 140 having the specific sheet resistance, each of the respective resistance values r11, r12, r13, and r14 of respective paths from the first touch point P1 to the first measurement position a, the second measurement position b, the third measurement position c, and the fourth measurement position d, and the respective resistance values r21, r22, r23, and r24 of respective paths from the second touch point P2 to the first measurement position a, the second measurement position b, the third measurement position c, and the fourth measurement position d may be preset based on a sheet resistance of the touch electrode 140. That is, all of the respective resistance values of respective paths from each of the coordinates of all positions on the touch electrode 140 to the first measurement position a, the second measurement position b, the third measurement position c, and the fourth measurement position d may be preset based on the sheet resistance of the touch electrode 140. That is, all resistance values may be prestored in a mapping table between the resistance and the position in the touch driving circuit 300.

Thus, when a first coordinate (x1, y1) of the first touch point P1 and a second coordinate (x2, y2) of the second touch point P2 are known to the touch driving circuit, the respective resistance values r11, r12, r13, and r14 and the respective resistance values r21, r22, r23, and r24 may be obtained from the mapping table by the touch driving circuit 300.

When the object touches the first touch point P1, a value of a first finger capacitor Cf1 upon the touch on the first touch point P1 may be calculated based on the sum of current values at the four corners of the touch electrode.

When the object touches the second touch point P2, a value of a second finger capacitor Cf2 upon the touch on the second touch point P2 may be calculated based on the sum of current values at the four corners of the touch electrode.

When the object simultaneously touches the first and second touch points P1 and P2, a value of a finger capacitor Cf1-Cf2 upon the multi-touch on the first and second touch points P1 and P2 may be calculated by subtracting the value of the second finger capacitor Cf2 from the value of the first finger capacitor CfL. In this regard, the first coordinate (x1, y1) of the first touch point P1 and the second coordinate (x2, y2) of the second touch point P2 may be calculated based on five variables.

Generally, the coordinates of the n multi touch points may be calculated based on $3n-1$ independent variables.

When the object simultaneously touches the first and second touch points P1 and P2, each of the respective resistance values r11, r12, r13, and r14 of respective paths from the first touch point P1 to the first measurement position a, the second measurement position b, the third measurement position c, and the fourth measurement position d, and the respective resistance values r21, r22, r23, and r24 of respective paths from the second touch point P2 to the first measurement position a, the second measurement position b, the third measurement position c, and the fourth measurement position d may be obtained from the mapping table by the touch driving circuit 300 as described above.

Referring to FIG. 3, when the object touches the first touch point P1, a sum Q1 of the sensed values sensed respectively at the four corners of the touch electrode may be calculated based on <Equation 1>:

$$Q1 = Cf1 * Vd = Q1a + Q1b + Q1c + Q1d \quad \text{Equation 1}$$

where Q1 represents the sum of the sensed values sensed respectively at the four corners of the touch electrode upon the touch on the first touch point P1, Vd is the touch driving voltage, Cf1 represents the capacitance value of the finger capacitor upon the touch on the first touch point P1, and Q1a, Q1b, Q1c, and Q1d respectively denote the respective sensed value at the first measurement position a, the second measurement position b, the third measurement position c, and the fourth measurement position d upon the touch on the first touch point P1.

Since the value sensed at each corner of the touch electrode is inversely proportional to each corresponding resistance (Q=I*t=Vd/r*t), Q1a, Q1b, Q1c, and Q1d may be calculated as follows.

$$Q1a = Q1 * (1/r11)/(1/r11 + 1/r12 + 1/r13 + 1/r14) \quad \text{Equation 2}$$
$$Q1b = Q1 * (1/r12)/(1/r11 + 1/r12 + 1/r13 + 1/r14)$$
$$Q1c = Q1 * (1/r13)/(1/r11 + 1/r12 + 1/r13 + 1/r14)$$
$$Q1d = Q1 * (1/r14)/(1/r11 + 1/r12 + 1/r13 + 1/r14)$$

When the object touches the second touch point P2, a sum Q2 of the sensed values sensed respectively at the four corners of the touch electrode may be calculated based on <Equation 2>:

$$Q2 = Cf2 * Vd = Q2a + Q2b + Q2c + Q2d \quad \text{Equation 3}$$

where Q2 represents the sum of the sensed values sensed respectively at the four corners of the touch electrode upon the touch on the second touch point P2, Vd is the touch driving voltage, Cf2 represents the capacitance value of the finger capacitor upon the touch on the second touch point P2, and Q2a, Q2b, Q2c, and Q2d respectively denote the respective sensed value at the first measurement position a, the second measurement position b, the third measurement position c, and the fourth measurement position d upon the touch on the second touch point P2.

Since the value sensed at each corner of the touch electrode is inversely proportional to each corresponding resistance (Q=I*t=Vd/r*t), Q2a, Q2b, Q2c, and Q2d may be calculated as follows.

$$Q2a = Q2 * (1/r21)/(1/r21 + 1/r22 + 1/r23 + 1/r24) \quad \text{Equation 4}$$
$$Q2b = Q2 * (1/r22)/(1/r21 + 1/r22 + 1/r23 + 1/r24)$$
$$Q2c = Q2 * (1/r23)/(1/r21 + 1/r22 + 1/r23 + 1/r24)$$
$$Q2d = Q2 * (1/r24)/(1/r21 + 1/r22 + 1/r23 + 1/r24)$$

When the object touches the first touch point P1 and the second touch point P2 at the same time, the sensed value sensed at each of the four corners of the touch electrode may be calculated as a sum of the sensed value sensed at each of the four corners of the touch electrode upon the touch on the first touch point P1 and the sensed value sensed at each of the four corners of the touch electrode upon the touch on the second touch point P2. Thus, when the object touches the first touch point P1 and the second touch point P2 at the same time, the sensed value Qa, Qb, Qc and Qd sensed at each of the four corners of the touch electrode may be calculated based on <Equation 5>:

$$Qa = Q1a + Q2a = Q1(1/r11)/(1/r11 + 1/r12 + 1/r13 + 1/r14) + \quad \text{Equation 5}$$
$$Q2(1/r21)/(1/r21 + 1/r22 + 1/r23 + 1/r24)$$
$$Qb = Q1b + Q2b = Q1(1/r12)/(1/r11 + 1/r12 + 1/r13 + 1/r14) +$$
$$Q2(1/r22)/(1/r21 + 1/r22 + 1/r23 + 1/r24)$$
$$Qc = Q1c + Q2c = Q1(1/r13)/(1/r11 + 1/r12 + 1/r13 + 1/r14) +$$
$$Q2(1/r23)/(1/r21 + 1/r22 + 1/r23 + 1/r24)$$
$$Qd = Q1d + Q2d = Q1(1/r14)/(1/r11 + 1/r12 + 1/r13 + 1/r14) +$$
$$Q2(1/r24)/(1/r21 + 1/r22 + 1/r23 + 1/r24)$$

Next, when the third switch SW3 and the fourth switch SW4 are turned off and the object touches the first touch point P1, sensing is performed only at the first measurement position a and the second measurement position b. Thus, the sum Q1 of the sensed values respectively sensed at the first measurement position a and the second measurement position b upon the touch on the first touch point P1 may be calculated as follows.

$$Q1 = Cf1 * Vd = Q1a + Q1b \quad \text{Equation 6}$$
$$Q1a = Q1 * (1/r11)/(1/r11 + 1/r12)$$
$$Q1b = Q1 * (1/r12)/(1/r11 + 1/r12)$$

Next, when the third switch SW3 and the fourth switch SW4 are turned off and the object touches the first touch point P1 and the second touch point P2 at the same time, the sum Q of the sensed values respectively sensed at the first measurement position a and the second measurement position b upon the multi-touch on the first touch point P1 and the second touch point P2 may be calculated as follows.

$$Q = Q1 + Q2 = Cf1 * Vd + Cf2 * Vd \quad \text{Equation 7}$$
$$Qa =$$
$$Q1a + Q1b = Q1 * (1/r11)/(1/r11 + 1/r12) + Q2 * (1/r21)/(1/r21 + 1/r22)$$

-continued $$Qb = Q1b + Q2b = Q1*(1/r12)/(1/r11 + 1/r12) + Q2*(1/r22)/(1/r21 + 1/r22)$$

Thus, based on the above <Equation 5> and <Equation 7>, the first coordinate values (x1, y1) and the second coordinate values (x2, y2) and the capacitance value of the finger capacitor Cf when the object touches the first touch point P1 and the second touch point P2 at the same time may be calculated by the touch driving circuit 300.

FIG. 5 is a table showing the measurement positions and the number of measurement values under the turn-on and turn-off of the switch circuit in the touch display device according to an embodiment of the present disclosure.

As shown in FIG. 5, 28 sensed values may be obtained by measuring the sensed values at the four measurement positions a, b, c and d while changing the turned-off switch. Thus, the coordinate data of up to 9 simultaneous multi-touch points may be calculated based on the 28 sensed values. That is, based on the law of the 3n−1, when n=9, at least 26 values should be required. In this regard, 28 is greater than 26, such that the coordinate data of up to 9 simultaneous multi-touch points may be obtained. However, when n=10, at least 29 sensed values are required. However, 28 is smaller than 29.

Figure 10:
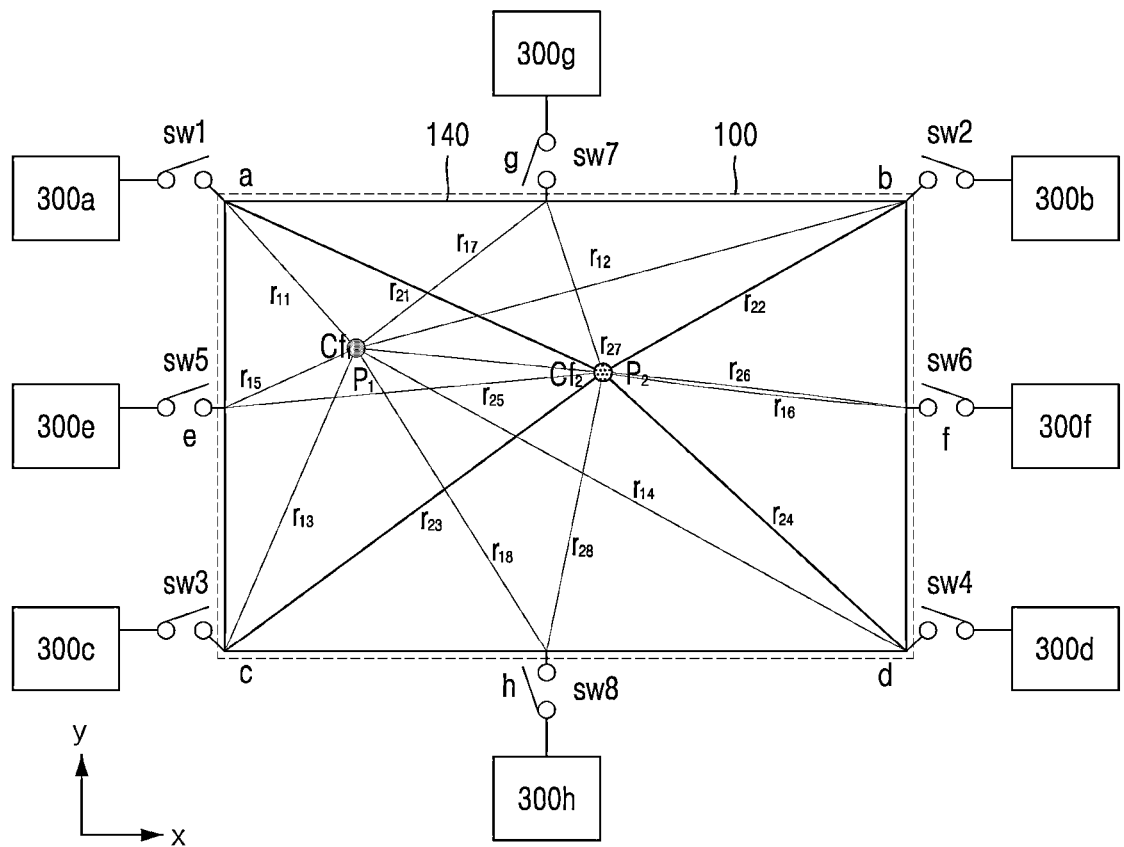
FIG. 10 is a diagram for illustrating multi-touch sensing in a touch display device according to another embodiment of the present disclosure.

Thus, in order to improve the accuracy of the coordinate calculation of the touch points or increase the number of simultaneous touch points whose the coordinated data can be calculated, four additional touch driving circuits may be further included which may correspond to 4 median points between the four corners of the touch electrode 140. This configuration is shown in FIG. 10.

In one example, a method for obtain the coordinate values of the touch points from the above Equations may be performed through numerical analysis. Alternatively, an accuracy at which the coordinate values of the touch points are calculated from the above Equations may be improved using machine learning techniques that are widely used recently.

Figure 6:
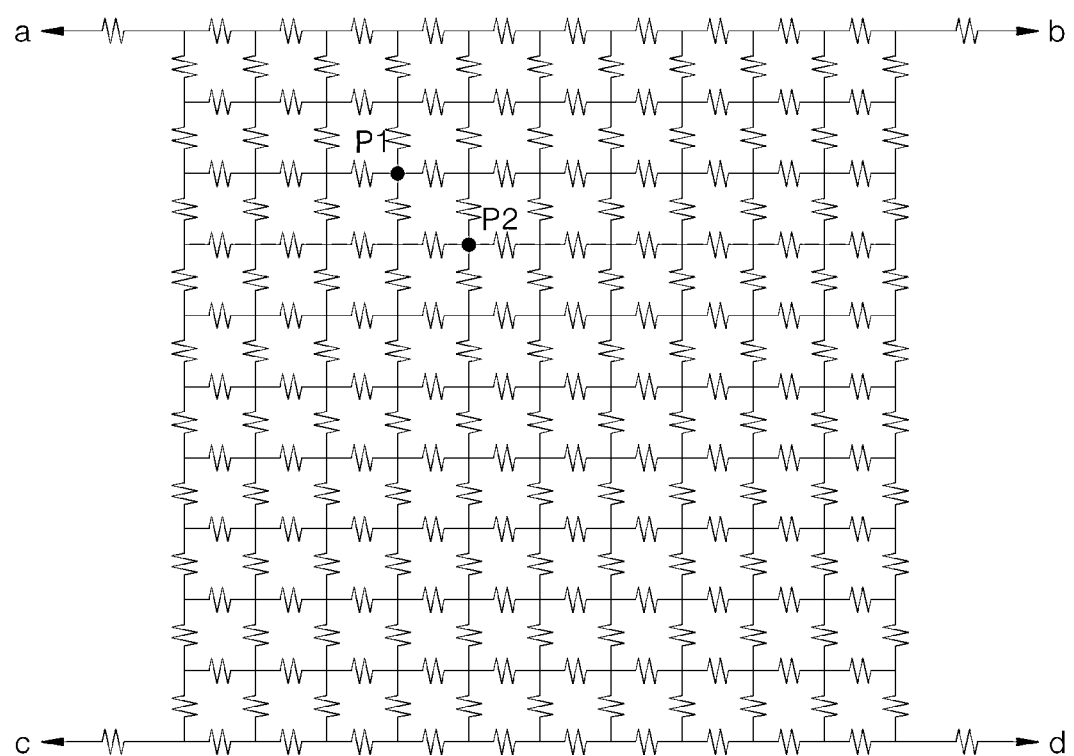
FIG. 6 shows an equivalent circuit based on a sheet resistance per a coordinate of each of all positions on the touch electrode in a touch display device according to an embodiment of the present disclosure.
Figure 7:
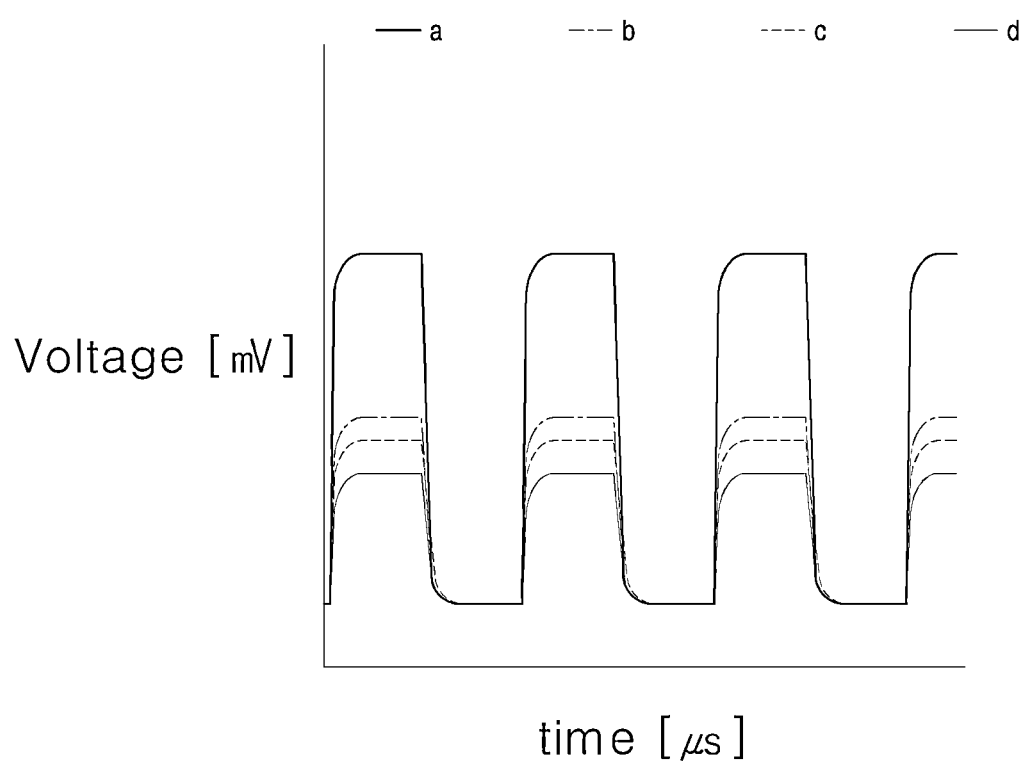
FIG. 7 shows the measurement result when the object touches only the first touch point P1 in FIG. 6 according to an embodiment of the present disclosure.
Figure 8:
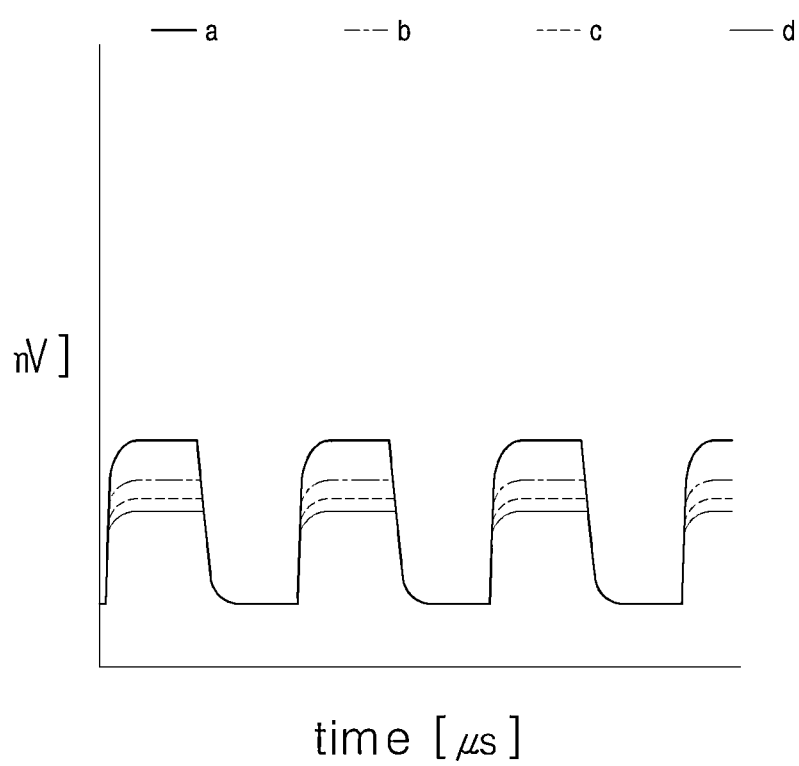
FIG. 8 shows the measurement result when the object touches only the second touch point P2 in FIG. 6 according to an embodiment of the present disclosure.
Figure 9:
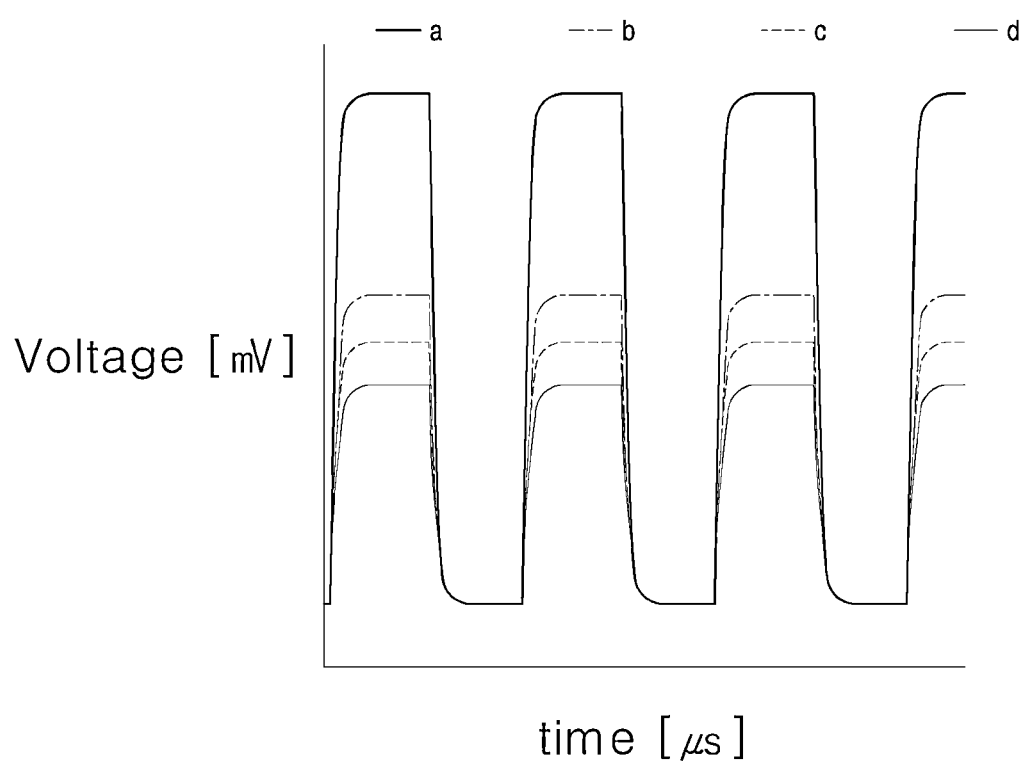
FIG. 9 shows the measurement result when the object touches the first touch point P1 and the second touch point P2 at the same time in FIG. 6.

FIG. 6 shows an equivalent circuit based on a sheet resistance per a coordinate of each of all positions on the touch electrode in a touch display device according to an embodiment of the present disclosure. FIG. 7 shows the measurement result when the object touches only the first touch point P1 in FIG. 6 according to an embodiment of the present disclosure. FIG. 8 shows the measurement result when the object touches only the second touch point P2 in FIG. 6 according to an embodiment of the present disclosure. FIG. 9 shows the measurement result when the object touches the first touch point P1 and the second touch point P2 at the same time in FIG. 6 according to an embodiment of the present disclosure.

The touch electrode has a sheet resistance. A finger capacitance on the touch on the first touch point P1 is 1.7 pF. A finger capacitance on the touch on the second touch point P2 is 1 pF. Thus, when a 10V driving voltage is applied to the touch electrode, the values respectively measured at the corners of the touch electrode are shown in FIG. 7 to FIG. 9.

It may be identified that when the object touches the first touch point P1 and the second touch point P2 at the same time, each of the values respectively measured at the corners a, b, c and d of the touch electrode amounts to the sum of the value measured at each of the corners a, b, c and d upon the touch on the first touch point P1 and the value measured at each of the corners a, b, c and d upon the touch on the second touch point P2.

In one example, the coordinate calculation of the multi-touch points as described above may be implemented using a touch driving power source, an amplifier, and a switch connected to each of the corners of the touch electrode embodied as a cathode electrode of the organic light-emitting diode (OLED) panel via each touch wiring.

Alternatively, the coordinate calculation of the multi-touch points as described above may be implemented using a configuration in which the touch electrode is disposed on top of or under the organic light-emitting diode panel, and a touch driving power source, an amplifier, and a switch are connected to each corner of the touch electrode via each wiring.

Furthermore, modulating the touch driving voltage may include a scheme in which a dummy electrode (shielding electrode) may be formed between the touch electrode and the display electrode, and a voltage across the dummy electrode and the touch electrode may be modulated, or a voltage across the touch electrode and the display electrode may be modulated.

FIG. 10 is a diagram for illustrating multi-touch sensing in a touch display device according to another embodiment of the present disclosure.

Referring to FIG. 10, the touch display device includes first to eighth switch circuits SW1, SW2, SW3, SW4, SW5, SW6, SW7 and SW8 and first to eighth touch driving circuit 300*a*, 300*b*, 300*c*, and 300*d*, 300*e*, 300*f*, 300*g*, and 300*h*.

The first to eighth switches SW1, SW2, SW3, SW4, SW5, SW6, SW7, and SW8 may be connected to the 8 measurement positions of the touch electrode 140 of the display panel 100, respectively. The touch electrode includes four corners, four sides, and respective four median points of the four sides, wherein the measurement positions include first to eighth measurement positions corresponding to the four corners and the four median points.

Each of the first to eighth touch driving circuit 300*a*, 300*b*, 300*c*, and 300*d*, 300*e*, 300*f*, 300*g*, and 300*h* may apply the touch driving signal to the touch electrode 140 via each of the first to eighth switches SW1, SW2, SW3, SW4, SW5, SW6, SW7, and SW8 and may receive each of sensed values respectively sensed at the first to eighth measurement positions in response to that each of the first to eighth switches SW1, SW2, SW3, SW4, SW5, SW6, SW7, and SW8 is turned on.

Furthermore, the touch driving circuit 300 may be configured to calculate the coordinates of the multi-touch points on the touch electrode (for example, the coordinates of the first touch point P1 and the second touch point P2), based on the sensed value sensed at each of the first to eighth measurement positions a to h. For example, the first to eighth touch driving circuits 300*a*, 300*b*, 300*c*, 300*d*, 300*e*, 300*f*, 300*g*, and 300*h* can apply touch driving signals to the first to eighth measurement positions a to h and sense sensing currents at the first to eighth measurement positions a to h.

In one example, during the touch period, all of the first to eighth touch driving circuits 300*a*, 300*b*, 300*c*, and 300*d*, 300*e*, 300*f*, 300*g*, and 300*h* are configured to respectively turn on all of the first to eighth switches SW1, SW2, SW3, SW4, SW5, SW6, SW7, and SW8 and to obtain the sensed values respectively sensed at all of the corresponding first to eighth measurement positions a to h connected thereto, respectively. For example, the first to eighth touch driving circuits 300*a*, 300*b*, 300*c*, 300*d*, 300*e*, 300*f*, 300*g*, and 300*h* can sense sensing current at the first to fourth measurement positions a to d by turning on the first to fourth switches SW1, SW2, SW3, and SW4, and turning off the fifth to eighth switches SW5, SW6, SW7, and SW8.

In addition, the first to eighth touch driving circuits 300a, 300b, 300c, 300d, 300e, 300f, 300g, and 300h can sense sensing current at the fifth to eighth measuring positions e to h by turning off the first to fourth switches SW1, SW2, SW3, and SW4, and turning on the fifth to eighth switches SW5, SW6, SW7, and SW8. In this manner, the first to eighth touch driving circuits 300a, 300b, 300c, 300d, 300e, 300f, 300g, and 300h can sense at least one sensing current at a corresponding measurement position by turning on or off at least one of the first to eighth switches SW1, SW2, SW3, SW4, SW5, SW6, SW7, and SW8.

In another example, during the touch period, at least one of the first to eighth touch driving circuits 300a, 300b, 300c, and 300d, 300e, 300f, 300g, and 300h is configured to turn on corresponding at least one of the first to eighth switches SW1, SW2, SW3, SW4, SW5, SW6, SW7, and SW8 and to obtain at least one sensed value sensed at corresponding at least one of the measurement positions a to h connected thereto, wherein during the touch period, each of the others of the first to eighth touch driving circuits 300a, 300b, 300c, and 300d, 300e, 300f, 300g, and 300h is configured to turn off each of the others of the first to eighth switches SW1, SW2, SW3, SW4, SW5, SW6, SW7, and SW8.

In this regard, the touch driving circuit 300 may be configured to calculate the coordinates of the multi-touch points on the touch electrode (for example, the coordinates of the first touch point P1 and the second touch point P2), based on all of the respective sensed value at the first to eighth measurement positions a to h, the sensed value at one or more of the first to eighth measurement positions a to h, respective resistance values r11, r12, r13, r14, r15, r16, r17, and r18 of respective paths from the first touch point P1 to the first to eighth measurement positions a to h, and respective resistance values r21, r22, r23, r24, r25, r26, r27, and r28 of respective paths from the second touch point P2 to the first to eighth measurement positions a to h.

According to the embodiments of the touch display device, the touch performance may be improved by detecting multiple point touch in the touch sensing scheme of sensing change in capacitance of the touch electrode.

Furthermore, the touch sensor may detect multiple point touch on a single monolithic electrode, such that a manufacturing cost of the touch panel may be lowered.

Furthermore, when combining the touch panel with the display panel, luminance and sharpness of a displayed image may be maintained.

Furthermore, the production energy of the touch panel may be reduced, and the touch panel process may be optimized.

A touch display device according to various aspects and embodiments of the present disclosure may be described as follows.

A first aspect of the present disclosure provides a touch display device comprising: a display panel including a touch electrode having measurement positions; a switch circuit connected to each of the measurement positions of the touch electrode; and a touch driving circuit connected to each of the measurement positions of the touch electrode via the switch circuit, wherein the touch driving circuit is configured to apply a touch driving signal to the touch electrode, receive sensed values from the measurement positions based on an operation of the switch circuit, and calculate coordinates of multi-touch points on the touch electrode, based on the sensed values.

According to some embodiments of the first aspect of the touch display device, the touch driving circuit is configured to calculate the coordinates of the multi-touch points on the touch electrode, based on all of the sensed values respectively sensed at the measurement positions, a sensed value sensed at at least one of the measurement positions, and resistance values of respective paths between the measurement positions and each of the multi-touch points.

According to some embodiments of the first aspect of the touch display device, resistance values of respective paths between the measurement positions and each of all of touch positions on the touch electrode are preset in the touch driving circuit based on a sheet resistance value of the touch electrode.

According to some embodiments of the first aspect of the touch display device, the measurement positions include corners of the touch electrode.

According to some embodiments of the first aspect of the touch display device, the touch electrode includes first to fourth corners, and the measurement positions include first to fourth measurement positions as the first to fourth corners, wherein the switch circuits include a first switch, a second switch, a third switch, and a fourth switch respectively connected to the first measurement position, the second measurement position, the third measurement position, and the fourth measurement position, wherein the touch driving circuit includes first to fourth touch driving circuits respectively connected to the first to fourth measurement positions via the first to fourth switches.

According to some embodiments of the first aspect of the touch display device, during a touch period, one of the first to fourth touch driving circuits is configured to turn on corresponding one of the first to fourth switches and to obtain the sensed value sensed at the measurement position connected thereto, wherein during the touch period, each of the others of the first to fourth touch driving circuits is configured to turn off each of the others of the first to fourth switches.

According to some embodiments of the first aspect of the touch display device, during a touch period, two of the first to fourth touch driving circuits are configured to respectively turn on corresponding two of the first to fourth switches and to obtain the sensed values respectively sensed at the corresponding two measurement positions connected thereto, respectively, wherein during the touch period, each of the other two of the first to fourth touch driving circuits is configured to turn off each of the other two of the first to fourth switches.

According to some embodiments of the first aspect of the touch display device, during a touch period, all of the first to fourth touch driving circuits are configured to respectively turn on all of the first to fourth switches and to obtain the sensed values respectively sensed at all of the corresponding measurement positions connected thereto, respectively.

According to some embodiments of the first aspect of the touch display device, the touch driving circuit is configured to calculate the coordinates of the multi-touch points on the touch electrode, based on: all of the respective sensed value at the first measurement position, the second measurement position, the third measurement position, and the fourth measurement position; the sensed values sensed respectively at the first measurement position and the second measurement position when the first switch and the second switch are turned on and the third switch and the fourth switch are tuned off; the sensed values sensed respectively at the third measurement position and the fourth measurement position when the first switch and the second switch are turned off and the third switch and the fourth switch are tuned on; respective resistance values of respective paths from the first touch point to the first measurement position, the second measurement position, the third measurement position, and the fourth measurement position; and respective resistance values of respective paths from the second touch point to the first measurement position, the second measurement position, the third measurement position, and the fourth measurement position.

According to some embodiments of the first aspect of the touch display device, the measurement positions include corners of the touch electrode, and a median point between adjacent ones of the corners.

According to some embodiments of the first aspect of the touch display device, the display panel includes: a display panel layer in which a plurality of sub-pixels are formed; and a touch panel layer disposed on the display panel layer, wherein the touch panel layer includes: a shielding electrode layer formed on top of the display panel layer; an overlay layer formed on top of the shielding electrode layer; an optically transparent adhesive layer formed on top of the overlay layer; and the touch electrode formed on top of the optically transparent adhesive layer.

According to some embodiments of the first aspect of the touch display device, the touch electrode is formed as a single monolithic electrode covering a touch area of the display panel.

According to some embodiments of the first aspect of the touch display device, the touch display device further comprises a shielding electrode driver configured to apply a modulated signal having a period and an amplitude equal to a period and an amplitude of the touch driving signal to the shielding electrode layer during a touch period.

According to some embodiments of the first aspect of the touch display device, the touch display device further comprises a power supply circuit, the display panel is configured to operate in a time-divided manner into a display period for displaying an image and a touch period for detecting a touch, and the power supply circuit is configured to apply a high-potential power voltage and a low-potential power voltage to respectively a high-potential power terminal and a low-potential power terminal of each of the sub-pixels through power supply lines during the display period and apply a modulated high-potential power voltage and a modulated low-potential power voltage having the same period and amplitude as those of the touch driving signal applied to the touch electrode to the high-potential power terminal and the low-potential power terminal, respectively.

According to some embodiments of the first aspect of the touch display device, the touch driving circuit includes a touch signal supply circuit which supplies a touch driving voltage as the touch driving signal to the touch electrode in response to a synchronization signal, a sensing circuit which senses a current signal corresponding to a change in capacitance of the touch electrode and provides a voltage signal corresponding to a current signal to a touch calculator, and the touch calculator which calculates coordinate data based on the voltage signal as a digital signal, the coordinate data incudes the coordinate of each of the multi-touch points and a touch intensity at each of the multi-touch points.

According to some embodiments of the first aspect of the touch display device, a mapping table between a resistance and a position is provided in the touch driving circuit, and the resistance values are prestored in the mapping table.

A second aspect of the present disclosure provides a touch display device comprising: a display panel including a touch electrode and configured to operate in a time-divided manner into a display period for displaying an image and a touch period for detecting a touch; a first switch circuit, a second switch circuit, a third switch circuit, and a fourth switch circuit respectively connected to a first measurement position, a second measurement position, a third measurement position, and a fourth measurement position respectively corresponding to fours corner of the touch electrode; and a touch driving circuit connected to each of the first to fourth measurement positions of the touch electrode via each of the first to fourth switch circuits, wherein during the touch period, wherein the touch driving circuit is configured to apply a touch driving signal to the touch electrode, receive sensed values from the first to fourth measurement positions based on an operation of the first to fourth switch circuits, and calculate coordinates of multi-touch points on the touch electrode, based on the sensed values.

According to some embodiments of the second aspect of the touch display device, the touch electrode is formed as a single monolithic electrode covering a touch area of the display panel.

According to some embodiments of the second aspect of the touch display device, the display panel includes a display panel layer in which a plurality of sub-pixels are formed, and a touch panel layer disposed on the display panel layer, the touch panel layer includes a shielding electrode layer formed on top of the display panel layer, an overlay layer formed on top of the shielding electrode layer, an optically transparent adhesive layer formed on top of the overlay layer, and the touch electrode formed on top of the optically transparent adhesive layer.

According to some embodiments of the second aspect of the touch display device, the touch display device further comprises a power supply circuit, the power supply circuit is configured to apply a high-potential power voltage and a low-potential power voltage to respectively a high-potential power terminal and a low-potential power terminal of each of the sub-pixels through power supply lines during the display period and apply a modulated high-potential power voltage and a modulated low-potential power voltage having the same period and amplitude as those of the touch driving signal applied to the touch electrode to the high-potential power terminal and the low-potential power terminal, respectively.

A third aspect of the present disclosure provides a touch display device comprising: a display panel including a touch electrode having measurement positions; a switch circuit connected to each of the measurement positions of the touch electrode; and a touch driving circuit connected to each of the measurement positions of the touch electrode via the switch circuit, wherein the touch driving circuit is configured to apply a touch driving signal to the touch electrode, receive sensed values from the measurement positions based on an operation of the switch circuit, and calculate coordinates of multi-touch points on the touch electrode, based on the sensed values, wherein the touch electrode includes four corners, and respective four median points of four sides, wherein the measurement positions include first to eighth measurement positions corresponding to the four corners and the four median points.

According to some embodiments of the third aspect of the stretchable touch display device, the switch circuits include first to eighth switches respectively connected to the first to eighth measurement positions, wherein the touch driving circuit includes first to eighth touch driving circuits respectively connected to the first to eighth measurement positions via the first to eighth switches.

According to some embodiments of the third aspect of the touch display device, during a touch period, all of the first to eighth touch driving circuits are configured to respectively turn on all of the first to eighth switches and to obtain the sensed values respectively sensed at all of the corresponding first to eighth measurement positions connected thereto, respectively.

According to some embodiments of the third aspect of the touch display device, during a touch period, at least one of the first to eighth touch driving circuits is configured to turn on corresponding at least one of the first to fourth switches and to obtain at least one sensed value sensed at corresponding at least one of the measurement positions connected thereto, wherein during the touch period, each of the others of the first to eighth touch driving circuits is configured to turn off each of the others of the first to eighth switches.

According to some embodiments of the third aspect of the touch display device, the display panel includes: a display panel layer in which a plurality of sub-pixels are formed; and a touch panel layer disposed on the display panel layer, wherein the touch panel layer includes: a shielding electrode layer formed on top of the display panel layer; an overlay layer formed on top of the shielding electrode layer; an optically transparent adhesive layer formed on top of the overlay layer; and the touch electrode formed on top of the optically transparent adhesive layer.

According to some embodiments of the third aspect of the touch display device, the touch display device further comprises a shielding electrode driver configured to apply a modulated signal having a period and an amplitude equal to a period and an amplitude of the touch driving signal to the shielding electrode layer during a touch period.

According to some embodiments of the third aspect of the touch display device, the touch electrode is formed as a single monolithic electrode covering a touch area of the display panel.

According to some embodiments of the third aspect of the touch display device, the touch display device further comprises a power supply circuit, the display panel is configured to operate in a time-divided manner into a display period for displaying an image and a touch period for detecting a touch, and the power supply circuit is configured to apply a high-potential power voltage and a low-potential power voltage to respectively a high-potential power terminal and a low-potential power terminal of each of the sub-pixels through power supply lines during the display period and apply a modulated high-potential power voltage and a modulated low-potential power voltage having the same period and amplitude as those of the touch driving signal applied to the touch electrode to the high-potential power terminal and the low-potential power terminal, respectively.

Although embodiments of the present disclosure have been described with reference to the accompanying drawings, the present disclosure is not limited to the above embodiments, but may be implemented in various different forms. A person skilled in the art may appreciate that the present disclosure may be practiced in other concrete forms without changing the technical spirit or essential characteristics of the present disclosure. Therefore, it should be appreciated that the embodiments as described above is not restrictive but illustrative in all respects.

What is claimed is:

1. A touch display device comprising:
    a display panel including a display panel layer having sub-pixels, a shielding electrode layer on the display panel layer, and a touch electrode on the shielding electrode layer;
    a switch circuit connected to each of measurement positions of the touch electrode; and
    a touch driving circuit connected to each of the measurement positions of the touch electrode via the switch circuit, and configured to apply a touch driving signal to the touch electrode, receive sensed values from the measurement positions based on an operation of the switch circuit, and calculate coordinates of multi-touch points on the touch electrode based on the sensed values; and
    a shielding electrode driver configured to apply to the shielding electrode layer, during a touch period, a modulated signal having a period and amplitude equal to those of the touch driving signal.

2. The touch display device of claim 1, wherein the touch driving circuit is configured to calculate the coordinates of the multi-touch points on the touch electrode based on all of the sensed values respectively sensed at the measurement positions, a sensed value sensed at at least one of the measurement positions, and resistance values of respective paths between the measurement positions and each of the multi-touch points.

3. The touch display device of claim 2, wherein the resistance values of respective paths between the measurement positions and each of all of touch positions on the touch electrode are preset in the touch driving circuit based on a sheet resistance value of the touch electrode.

4. The touch display device of claim 1, wherein the measurement positions include corners of the touch electrode.

5. The touch display device of claim 4, wherein the touch electrode includes a first corner, a second corner, a third corner, and a fourth corner, and the measurement positions include a first measurement position, a second measurement position, a third measurement position, and a fourth measurement position as the first corner, the second corner, the third corner, and the fourth corner, respectively,
    wherein the switch circuit includes a first switch, a second switch, a third switch, and a fourth switch respectively connected to the first measurement position, the second measurement position, the third measurement position, and the fourth measurement position,
    wherein the touch driving circuit includes a first touch driving circuit, a second touch driving circuit, a third touch driving circuit, and a fourth touch driving circuit respectively connected to the first measurement position, the second measurement position, the third measurement position, and the fourth measurement position via the first switch to the fourth switch, respectively.

6. The touch display device of claim 5, wherein during a touch period, one of the first touch driving circuit to the fourth touch driving circuit is configured to turn on a corresponding one of the first switch to the fourth switch and to obtain a sensed value sensed at the measurement position connected thereto,
    wherein during the touch period, each of others of the first touch driving circuit to the fourth touch driving circuit is configured to turn off each of the others of the first switch to the fourth switch.

7. The touch display device of claim 5, wherein during a touch period, two of the first touch driving circuit to the fourth touch driving circuit are configured to respectively turn on corresponding two of the first switch to the fourth switch and to obtain the sensed values respectively sensed at the corresponding two measurement positions connected thereto, respectively, wherein during the touch period, each of the other two of the first touch driving circuit to the fourth touch driving circuit is configured to turn off each of the other two of the first switch to the fourth switch.

8. The touch display device of claim 5, wherein during a touch period, all of the first touch driving circuit to the fourth touch driving circuit are configured to respectively turn on all of the first switch to the fourth switch and to obtain the sensed values respectively sensed at all of the corresponding measurement positions connected thereto, respectively.

9. The touch display device of claim 5, wherein the touch driving circuit is configured to calculate the coordinates of the multi-touch points on the touch electrode, based on:
- all of the sensed values at the first measurement position, the second measurement position, the third measurement position, and the fourth measurement position;
- the sensed values sensed respectively at the first measurement position and the second measurement position when the first switch and the second switch are turned on and the third switch and the fourth switch are tuned off;
- the sensed values sensed respectively at the third measurement position and the fourth measurement position when the first switch and the second switch are turned off and the third switch and the fourth switch are tuned on;
- respective resistance values of respective paths from a first touch point to the first measurement position, the second measurement position, the third measurement position, and the fourth measurement position; and
- respective resistance values of respective paths from a second touch point to the first measurement position, the second measurement position, the third measurement position, and the fourth measurement position.

10. The touch display device of claim 1, wherein the measurement positions include corners of the touch electrode, and a median point between adjacent ones of the corners.

11. The touch display device of claim 1, wherein the display panel includes:
- the display panel layer including a plurality of sub-pixels; and
- a touch panel layer on the display panel layer,
wherein the touch panel layer includes:
- the shielding electrode layer on top of the display panel layer;
- an overlay layer on top of the shielding electrode layer;
- an optically transparent adhesive layer on top of the overlay layer; and
- the touch electrode on top of the optically transparent adhesive layer.

12. The touch display device of claim 11, wherein the touch electrode is a single monolithic electrode covering a touch area of the display panel.

13. A touch display device comprising:
- a display panel including a touch electrode, the display panel configured to operate in a time-divided manner into a display period during which an image is displayed and a touch period during which a touch is detected;
- a first switch, a second switch, a third switch, and a fourth switch respectively connected to a first measurement position, a second measurement position, a third measurement position, and a fourth measurement position respectively corresponding to fours corner of the touch electrode; and
- a touch driving circuit connected to each of the first measurement position to the fourth measurement position of the touch electrode via each of the first switch to the fourth switch,
wherein during the touch period, the touch driving circuit is configured to:
- apply a touch driving signal to the touch electrode;
- receive sensed values from the first measurement position to the fourth measurement position based on an operation of the first switch to the fourth switch; and
- calculate coordinates of multi-touch points on the touch electrode based on the sensed values,
wherein during the touch period, all of the first to fourth touch driving circuits are configured to respectively turn on all of the first to fourth switches and obtain the sensed values from the corresponding measurement positions.

14. A touch display device comprising:
- a display panel including a touch electrode having measurement positions;
- a switch circuit connected to each of the measurement positions of the touch electrode; and
- a touch driving circuit connected to each of the measurement positions of the touch electrode via the switch circuit,
wherein the touch driving circuit is configured to:
- apply a touch driving signal to the touch electrode;
- receive sensed values from the measurement positions based on an operation of the switch circuit; and
- calculate coordinates of multi-touch points on the touch electrode based on the sensed values,
wherein the touch electrode includes four corners, and respective four median points of four sides,
wherein the measurement positions include a first measurement position to an eighth measurement position corresponding to the four corners and the respective four median points.

15. The touch display device of claim 14, wherein the switch circuit include a first switch to an eighth switch respectively connected to the first measurement position to the eighth measurement position,
wherein the touch driving circuit includes a first touch driving circuit to an eighth touch driving circuit respectively connected to the first measurement position to the eighth measurement position via the first switch to the eighth switch.

16. The touch display device of claim 15, wherein during a touch period, all of the first touch driving circuit to the eighth touch driving circuit are configured to respectively turn on all of the first switch to the eighth switch and to obtain the sensed values respectively sensed at all of the corresponding first measurement position to the eighth measurement position connected thereto, respectively.

17. The touch display device of claim 15, wherein during a touch period, at least one of the first touch driving circuit to the eighth touch driving circuit is configured to turn on corresponding at least one of the first switch to the fourth switch and to obtain at least one sensed value sensed at corresponding at least one of the measurement positions connected thereto,
wherein during the touch period, each of the others of the first touch driving circuit to the eighth touch driving circuit is configured to turn off each of the others of the first switch to the eighth switch.

18. The touch display device of claim 14, wherein the display panel includes:

a display panel layer including a plurality of sub-pixels; and a touch panel layer on the display panel layer, wherein the touch panel layer includes:

a shielding electrode layer on top of the display panel layer;

an overlay layer on top of the shielding electrode layer;

an optically transparent adhesive layer on top of the overlay layer; and the touch electrode on top of the optically transparent adhesive layer.

19. The touch display device of claim 18, wherein the touch display device further comprises a shielding electrode driver configured to apply a modulated signal having a period and an amplitude equal to a period and an amplitude of the touch driving signal to the shielding electrode layer during a touch period.

* * * * *